United States Patent [19]

Williams et al.

[11] 4,355,239

[45] Oct. 19, 1982

[54] ELECTRICAL POWER SUPPLY ARRANGEMENT

[75] Inventors: David C. Williams, Kings Langley; Peter A. Walsh, Hemel Hempstead, both of England

[73] Assignee: Lucas Industries Limited, Birmingham, England

[21] Appl. No.: 221,537

[22] Filed: Dec. 31, 1980

[30] Foreign Application Priority Data

Jan. 15, 1980 [GB] United Kingdom ............... 8001255

[51] Int. Cl.³ ............................................. H02P 9/10
[52] U.S. Cl. ...................................... 307/41; 307/135; 322/8
[58] Field of Search ............... 307/135, 38, 41; 322/7, 322/8, 22, 37

[56] References Cited

U.S. PATENT DOCUMENTS 460,245  9/1891  Arnold ............................. 322/8
2,845,593  7/1958  Lowry, Jr. ..................... 322/8 X Primary Examiner—G. Z. Rubinson
Assistant Examiner—James L. Dwyer
Attorney, Agent, or Firm—Trexler, Bushnell & Wolters, Ltd.

[57] ABSTRACT

An electrical power supply arrangement comprises an electrical generator having a field winding and supplying current through a switching device to external loads. The switching device is responsive to sequential switching signals from a control circuit, and the control circuit also provides a control signal to reduce the field voltage of the generator during each switching operation, so that switching if effected when no current is flowing to the loads.

5 Claims, 4 Drawing Figures

ELECTRICAL POWER SUPPLY ARRANGEMENT

This invention relates to an electrical power supply arrangement whose connection to an external load, or loads, is required to be continually switched on and off.

In particular the invention relates to a power supply arrangement for the electrical heaters of an aircraft de-icing system.

It is known to provide switching arrangements in which electrical power is supplied to a plurality of loads in a predetermined sequence at relatively short intervals. Where the loads are heater elements, the currents required to be switched may be considerable, and it has been necessary to provide switching elements capable of dealing with these currents. The present invention provides a power supply arrangement in which high currents are not required to be switched, even though the load currents may be high. The switching elements may thereby be less massive, and/or complex, resulting in a considerable advantage where the switching arrangements forms part of an aircraft de-icing system. The advantages of the present invention are not, however, limited to aircraft systems, but may usefully be applied to other systems in which high electric currents are required to be switched, and in which interruption or reduction of current from a generator is acceptable.

An electrical power supply arrangement according to the invention comprises an electric generator having a field winding, means for regulating a voltage applied to said field winding, switch means for controlling current supply from said generator to an external load, and means for causing said field current to be reduced and for causing operation of said switch means during said field current reduction.

In a preferred embodiment said switch means is operable to provide selective connection between said generator and a plurality of external loads.

A particular embodiment of the invention will now be described by way of example only and with reference to the accompanying drawings in which.

Figure 1:
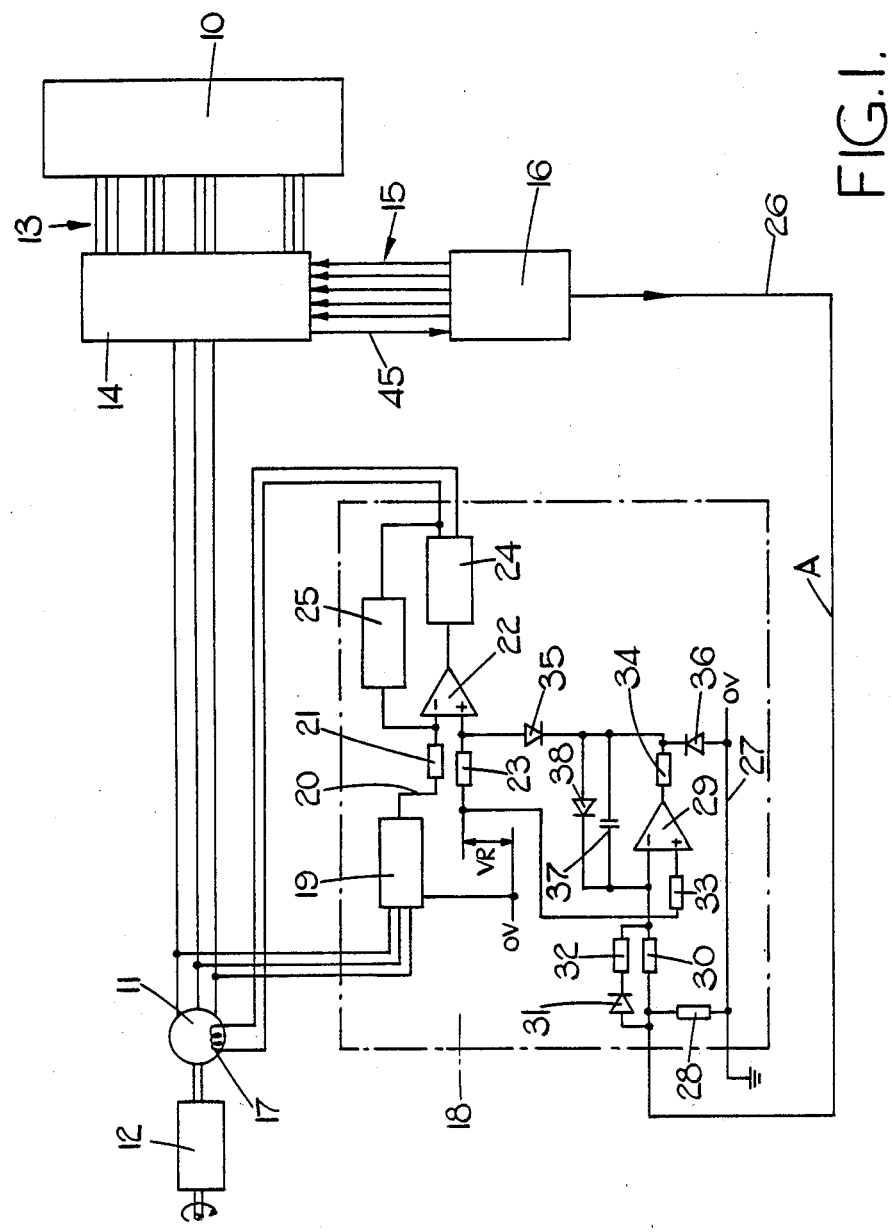
FIG. 1 is a diagram of a current supply arrangement according to the invention.

The arrangement shown in FIG. 1 is intended for providing three-phase current to a plurality of heater elements in an aircraft de-icing system, indicated generally at 10. The arrangement comprises a three-phase generator 11 which is driven through a gear box 12 from an engine (not shown) of the aircraft. Three-phase current is supplied on selected lines 13 to corresponding heater elements in the system 10 by a switching device 14 which is responsive to control signals on line 15 from a control circuit 16. The circuit 16 and device 14 are shown in more detail in FIGS. 2 and 3.

The generator 11 includes a field winding 17 the voltage in which is controlled by a circuit 18 which includes a device 19 responsive to the magnitudes of the voltages at the three output terminals of the generator 11 and providing, on a line 20, a d.c. signal corresponding to a mean value of these voltage magnitudes. The signal on line 20 is applied through a resistor 21 to one input of a differential amplifier 22 whose other input is connected to a reference voltage VR through a resistor 23. The output from amplifier 22 corresponds to a generator output voltage error signal and controls a power amplifier 24 which regulates the current in the field winding 17. A feedback circuit 25 ensures that changes in the generator field current are reflected substantially immediately in the output of the amplifier 22. A switching command signal on any of the lines 15 from circuit 16 to the device 14 is preceded by the onset of a control signal A on a line 26 from the circuit 16 to the circuit 18. Line 26 is connected to an earth rail 27 through a resistor 28, and also to the inverting input of a differential amplifier 29 through a resistor 30. A diode 31 and resistor 32 are connected as a series arrangement in parallel with the resistor 30. The other input of the amplifier 29 is connected to the reference voltage VR through a resistor 33. The output of the amplifier 29 is connected through a resistor 34 to the cathodes of respective diodes 35, 36 the anode of diode 35 being connected to the reference voltage input of amplifier 22 and the anode of diode 36 being connected to the earth rail 27. A capacitor 37 is connected between the inverting input of amplifier 29 and the cathodes of diodes 35, 36 and a diode 38 is connected in parallel with capacitor 37 and with its anode connected to the cathodes of the diodes 35, 36.

The amplifier 29, resistors 28, 30, 32 and capacitor 37 provides a ramp generating circuit. In the absence of the control signal A on line 26 the output voltage from amplifier 29 corresponds to the reference voltage VR plus the forward voltage drop of diode 38. Diode 35 is thus reverse biassed and the reference voltage VR is unmodified before its application to amplifier 22. The generator field current is thus dependent only on the sensed voltages at the generator output.

When the control signal A is applied to line 26 the voltage at the junction of resistor 34 and diode 36 falls at a rate dependent on the values of resistor 30, 32 and capacitor 37. The voltage at the positive input of amplifier 22 thus falls, the diode 36 preventing this voltage from falling substantially below zero. The voltage output of amplifier 22 and hence the field current output of amplifier 24 thus falls to zero, and this fall is accompanied by a fall in the peak-to-peak voltage of the output of generator 11, as indicated at J in FIG. 4. Subsequent removal of the control signal A on line 26 causes the voltage at the positive input of amplifier 22 to rise at a rate determined by the values of resistors 28, 30 and capacitor 37, and the peak-to-peak voltage of the generator output again rises.

Figure 2:
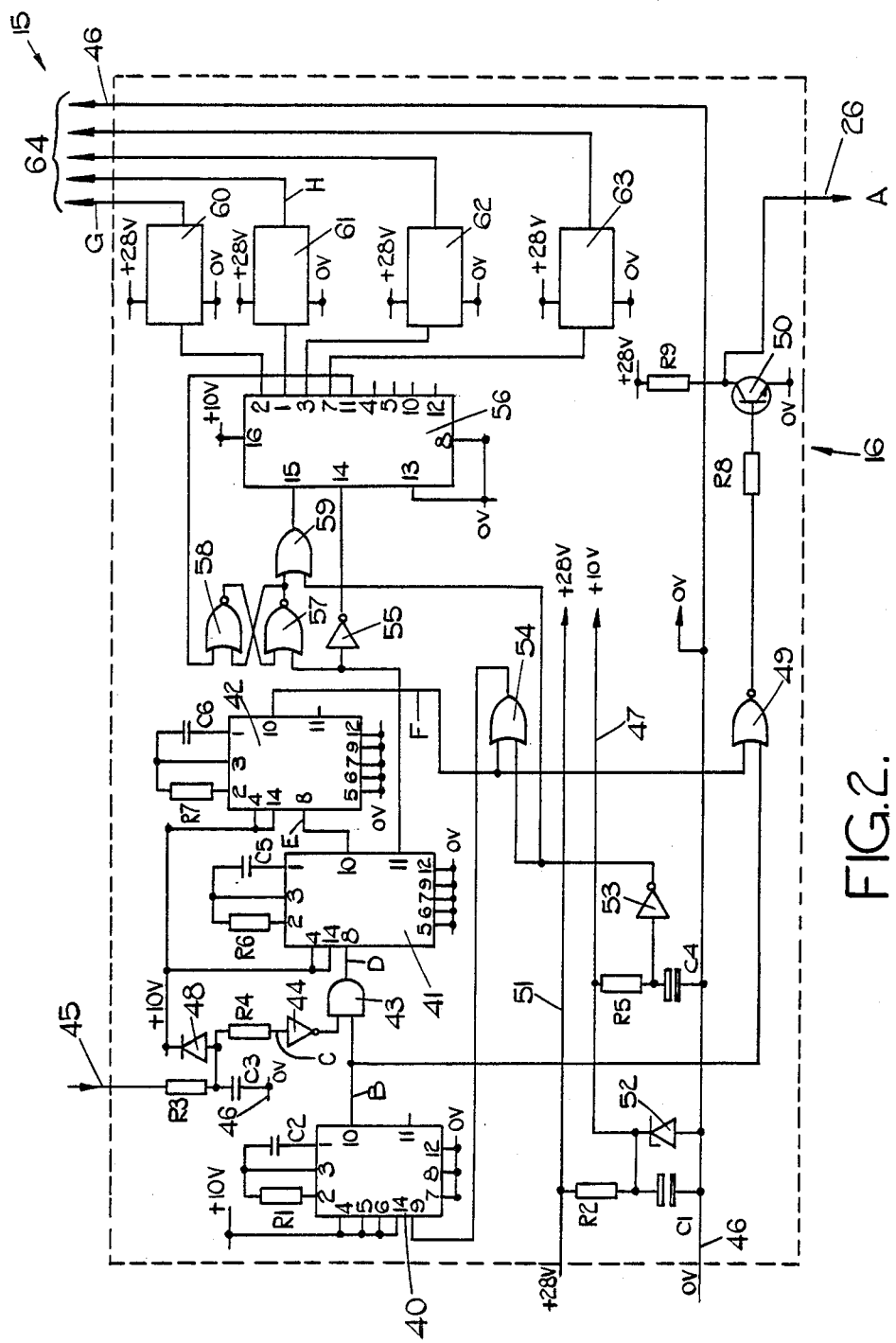
FIG. 2 shows details of a control circuit in the arrangement of FIG. 1.

The control circuit 16 is shown in more detail in FIG. 2 and includes integrated circuits 40, 41, 42, each of which is a National Semiconductor type CD 4047B. Circuit 40 is connected to operate as an astable multivibrator and has an associated resistor R1 and capacitor C2 which cause the circuit 40 to provide a low level signal of 4 seconds duration at its output terminal 10, the signal at terminal 10 being high at other times. The output terminal 10 of circuit 40 is connected to one input of an AND gate 43, whose output is connected to terminal 8 of the circuit 41. Circuit 41 is connected to operate as a monostable whose timing is set by an associated resistor R6 and capacitor C5. The other input of AND gate 43 is obtained from the output of an inverter 44 whose input is connected through series resistors R4, R3 to a zero volt signal line 45 from the switching circuit 14. The junction of resistors R4, R3 is connected to a 0 volt rail 46 through a capacitor C3.

The circuit 41 is connected to operate as a monostable and has its input terminal 8 connected to the output of the gate 43, and its terminals 4, 14 connected to a 10 volt rail 47. A resistor R6 and a capacitor C5 are connected to the circuit 41 so that the latter provides a one millisecond high level output at its terminal 10, and a corresponding low level output at its terminal 11, in response to a high level signal from the gate 43.

The terminal 10 of circuit 41 is connected directly to terminal 8 of the circuit 42 which is connected to act as a monostable and has its terminals 4, 14 connected to the 10 volt rail 47. An associated resistor R7 and capacitor C6 causes the circuit to provide a high level output of 100 milliseconds duration at its terminal 10 in response to an input signal at its terminal 8. A diode 48 has its cathode connected to the 10 volt rail 47 and its anode connected to the junction of resistor R4 and capacitor C3 to limit the voltage applied to the inverter 44 when there is a high voltage on the line 45.

The terminal 10 of the circuit 40 is connected to one input of a NOR gate 49, the other input of which is connected to the terminal 10 of circuit 42. The output of gate 49 is connected through a resistor R8 to the base of a npn transistor 50 whose emitter is connected to the 0 volt rail 46 and whose collector is connected to the circuit 18 through the line 26, and is also connected to a 28 volt rail 51 through a resistor R9.

Connected between the rails 46, 51 is a series arrangement of a capacitor C1 and a resistor R2, a zener diode 52 being connected across the capacitor C1 to maintain the junction of the capacitor C1 and resistor R2 at 10 volts, this junction being connected to the 10 volt rail 47. A capacitor C4 and resistor R5 are connected between the rails 46, 51 and the junction of the capacitor C4 and resistor R5 is connected through an inverter 53 to one input of an OR gate 54, whose other input is connected to the terminal 10 of the circuit 42. The output of OR gate 54 to the reset terminal 9 of the circuit 40. The signal at terminal 10 of circuit 40 is thus reset to a low level in response to the 100 millisecond high level output at terminal 10 of circuit 42.

The terminal 11 of circuit 41 is connected through an inverter 55 to the clock terminal 14 of an integrated octal counter circuit 56, which is a National Semiconductor type C.D. 4022B. Circuit 56 has eight decoded outputs, the first four of these, from terminals 2, 1, 3 and 7 being used in sequence. The inverse output terminal 11 of circuit 41 is connected to one input of a NOR gate 57 whose other input is connected to the output of a NOR gate 58. The output of NOR gate 57 is connected to one input of an OR gate 59 whose other input is connected to the output of the inverter 53, the output of OR gate 59 being connected to the reset terminal 15 of the circuit 56. The output of NOR gate 57 is also connected to one input of the gate 58, whose other input is connected to the fifth decode terminal 11 of the circuit 56. The gates 57, 58 are thus connected to form a latch, and a high level signal at terminal 11 of circuit 56 results in a high level signal from gate 57, until the signal from terminal 11 of circuit 41 goes high, whereupon the high level reset signal is removed from terminal 15 of circuit 56.

Power amplifiers 60, 61, 62, 63 are responsive to high level signals from the respective terminals 2, 1, 3 and 7 of the circuit 56 to provide 28 volt signals on respective ones of a group of lines 64 in the lines 15, the remaining one of the lines 15 being provided by the 0 volt rail 46.

Figure 3:
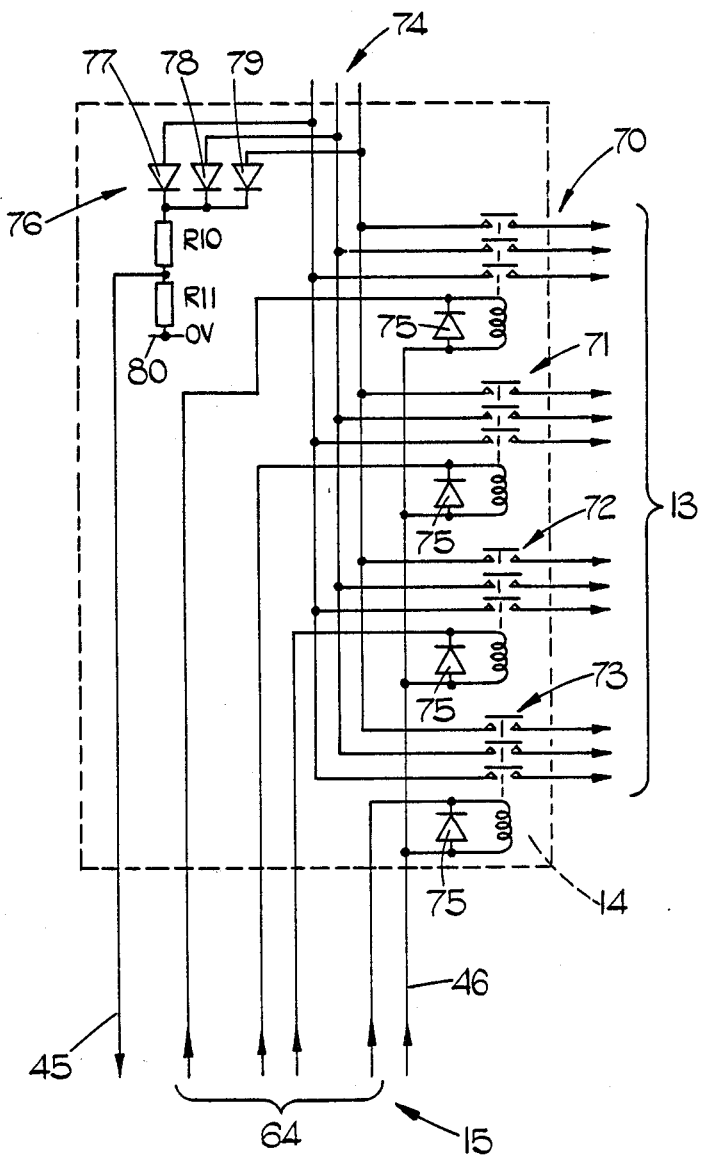
FIG. 3 shows details of a switching device in the arrangement of FIG. 1.

The switching device 14 is shown in more detail in FIG. 3 and includes four electro-magnetic contactors 70, 71, 72, 73 which are responsive to energising signals on the lines 64 from the respective amplifiers 60, 61, 62, 63 to apply a three-phase supply on lines 74 from the generator 11 to selected heater elements in the de-icing system 10. Each of the contactors 70–73 has a diode 75 across its energising coil to suppress high transient voltages. The operating of each of the contactors 70–73 is substantially less than the 100 millisecond time set by the circuit 42, restrictor R7 and capacitor C6. The circuit 14 also includes a voltage sensing arrangement 76 comprising diodes 77, 78, 79, connected between respective ones of the lines 74 and one end of a resistor R10 whose other end is connected through a resistor R11 to a 0 volt rail 80. The junction of the resistors R10, R11 is connected through the line 45 to the resistor R3 in the circuit 16.

When a 28 volts supply is applied to the rail 51 the capacitor C4 charges in a time dependent on the value of C4 and resistor R5. Before capacitor C4 charges up the low voltage input to inverter 53 provides a high level signal to OR gate 54, resetting the circuit 40, so that the output signal from terminal 10 of circuit 40 is initially low. The high level signal from inverter 53 is applied through the gate 59 to set the circuit 56 to provide an output at its terminal 2. When the capacitor C4 is charged up the output of the gate 53 goes low and the foregoing reset signals are terminated.

The control signal A on line 26 is applied only when the transistor 50 is switched off, that is in the pressure of a high level signal B at terminal 10 of circuit 40 or a high level signal F at terminal 10 of circuit 42. As indicated above the control signal A causes the peak-to-peak voltage of the output of the generator 11 to fall, this fall being sensed on the line 45 and resulting in a decrease in the voltage C at the input of the inverter 44. The consequent rise in voltage at the output of inverter 44 combines with the signal B to provide a short duration high level pulse D at terminal 8 of circuit 41, causing the latter to provide a 1 millisecond high level pulse E at terminal 8 of circuit 42. Circuit 42 then provides a 100 millisecond high level pulse F at its terminal 10, and the pulse F is applied to gate 54 to reset the circuit 40. The pulse F also causes the output of gate 49 to be maintained low and the transistor 50 switched off, whereby the signal A on line 26 is maintained high until the end of the pulse F.

The low level signal at terminal 11 of circuit 41 is inverted by the inverter 55 to correspond to the signal E and advances the counter 56 by one step de-energising, for example, the amplifier 60 and energising the amplifier 61. The signal G on one of the lines 64 thus ends, and simultaneously the signal H on another of these lines starts.

Figure 4:
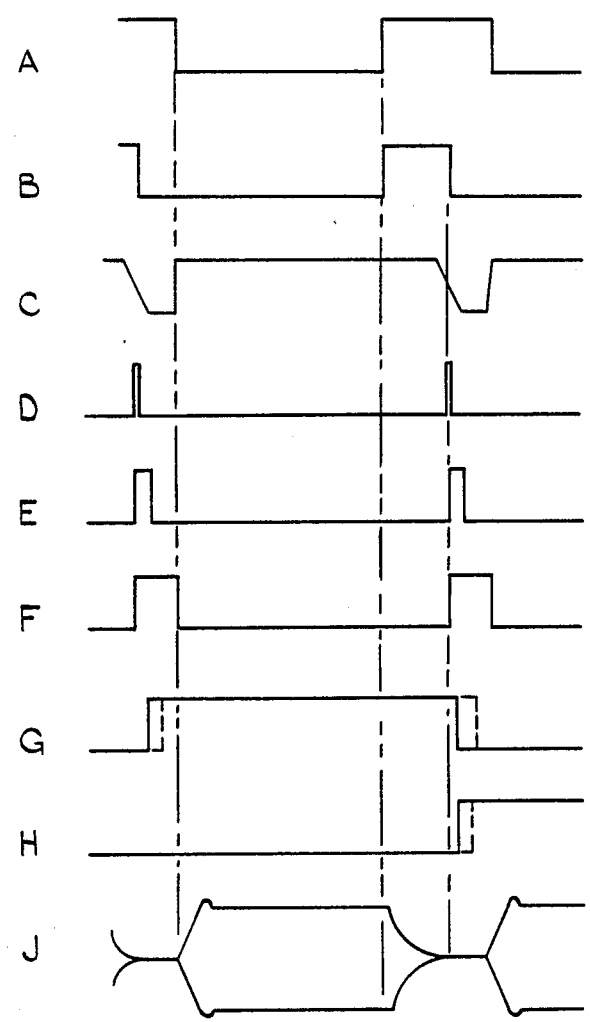
FIG. 4 shows the relationship between electric signals at various locations in the arrangement of FIG. 1.

The relationship of the foregoing signals is shown in FIG. 4, and it will be seen that the switching operation effected by signals G and H occurs wholly within the period of the control signal A, that is during the period when the peak-to-peak voltage J of the output of the generator 11 is substantially zero. The contactors 70–73 are thus not required to make or break load current to the heater elements in the system 10. Furthermore, the sudden application and removal of electrical loads on the generator 11 is avoided, resulting in a reduction of mechanical loads on the generator and on its associated drive and gear box 12. Finally radio-frequency interference resulting from making and breaking of high currents is avoided.

We claim:

1. An electrical power supply arrangement comprising an electric generator having a field winding, means for regulating a voltage applied to said field winding, a plurality of switch means for sequentially controlling current supply from said generator to respective ones of a plurality of external loads, means for causing said field voltage to be cyclically reduced, and means responsive to said cyclic reductions for causing operation of said switch means during said reduction.

2. An electrical power supply arrangement comprising an electric generator having a field winding, means for regulating a voltage applied to said field winding, switch means for controlling current supply from said generator to an external load, means for causing said field voltage to be reduced and for causing operation of said switch means during said field voltage reduction, said means for causing reduction of the field voltage and for operation of the switch means comprising means for supplying a control signal to said voltage regulating means, and means for generating a switching signal which lies wholly within the period of said control signal.

3. An arrangement as claimed in claim 2 in which said voltage regulating means comprises means responsive to said control signal for generating a ramp voltage, and means responsive to said ramp voltage and to an output voltage from said generator for reducing said field voltage.

4. An arrangement as claimed in claim 3 in which said means for reducing the field voltage is also responsive to a reference voltage.

5. An arrangement as claimed in any of claims 1, 2, 3 or 4 in which said switch means includes a plurality of contactors for controlling current supply to respective ones of a plurality of external loads, and said switch operating means includes means for generating switching signals sequentially to said contactors, each of said switching signals lying wholly within the period of one of said control signals.

* * * * *